United States Patent [19]

Swanson et al.

[11] 4,126,556
[45] Nov. 21, 1978

[54] APPARATUS FOR REMOVAL OF AN IMMISCIBLE LIQUID FROM A LIQUID MIXTURE

[75] Inventors: Clare E. Swanson, White Bear Lake; Michael G. Kelly, Blaine, both of Minn.

[73] Assignee: Conwed Corporation, St. Paul, Minn.

[21] Appl. No.: 768,037

[22] Filed: Feb. 14, 1977

[51] Int. Cl.² .............................................. C02B 9/02
[52] U.S. Cl. ........................ 210/242 AS; 210/DIG. 26
[58] Field of Search ............... 210/23 R, 40, 242 AS, 210/DIG. 26

[56] References Cited

U.S. PATENT DOCUMENTS

| | | | |
|---|---|---|---|
| 3,236,768 | 2/1966 | Litt | 210/23 R |
| 3,607,741 | 9/1971 | Sohnius | 210/DIG. 26 |
| 3,667,608 | 6/1972 | Burroughs et al. | 210/DIG. 26 |
| 3,681,237 | 8/1972 | Orban et al. | 210/DIG. 26 |
| 3,770,575 | 11/1973 | Ball | 210/DIG. 26 |

*Primary Examiner*—Charles N. Hart
*Assistant Examiner*—Ivars Cintins
*Attorney, Agent, or Firm*—Eyre, Mann, Lucas & Just

[57] ABSTRACT

Method and apparatus are disclosed for removing a first immiscible liquid from a liquid mixture comprising at least two immiscible liquids. A material preferentially sorptive of the first immiscible liquid and capable of sorbing the first immiscible liquid therein and therealong is positioned as a siphon with a first or intake end contacting the first immiscible liquid and a second or discharge end placed below at least the first immiscible liquid level, and outside of the liquid mixture. The first immiscible liquid is sorbed by the material and rises therein and/or along. The first immiscible liquid is removed or "siphoned" from the mixture and discharged outside thereof when sorbing has progressed sufficiently to prime the material, which removes or "siphons" the first immiscible liquid out of the mixture. The material may also be primed independently by saturating the sorbent material. The invention is especially suitable for the removal of oil from an aqueous mixture.

4 Claims, 7 Drawing Figures

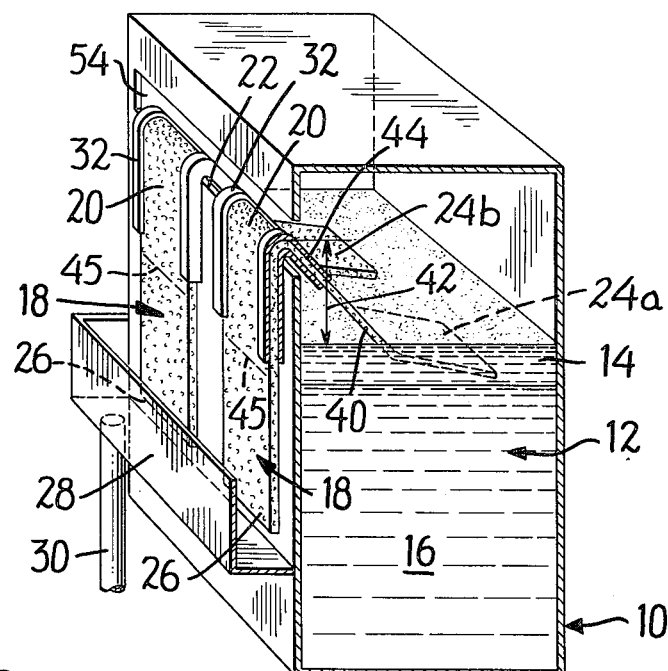
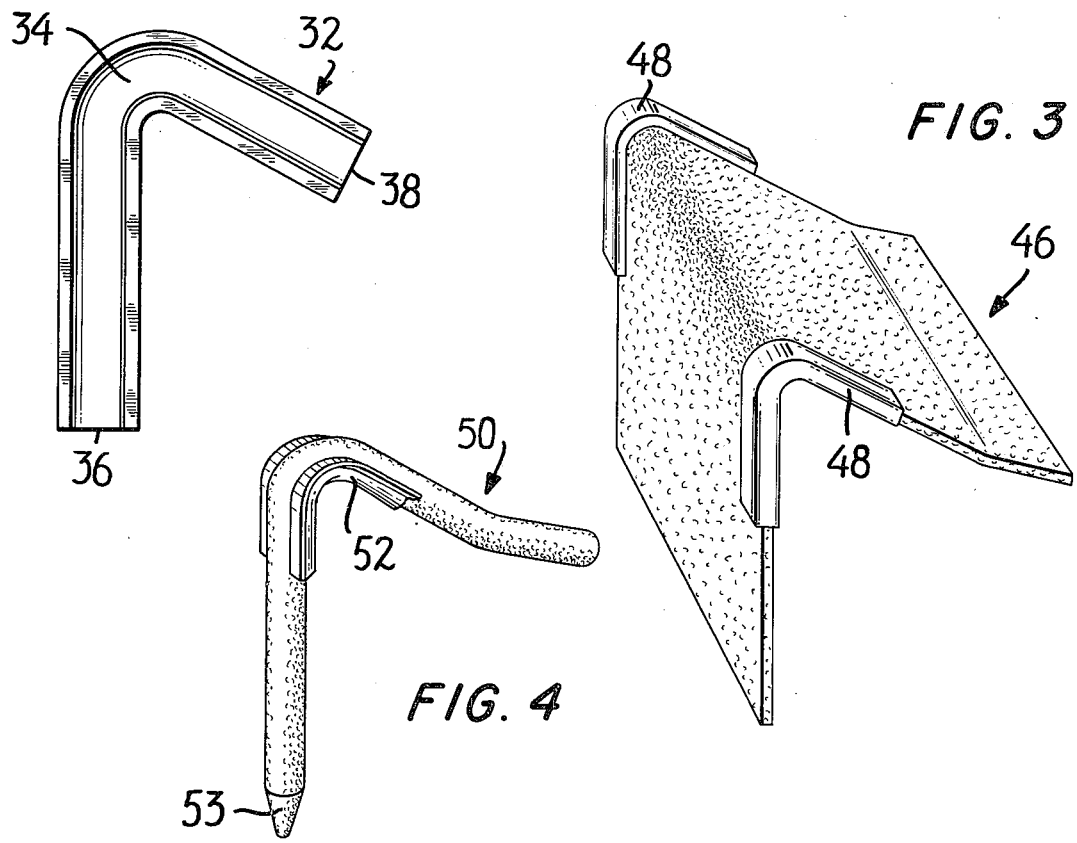

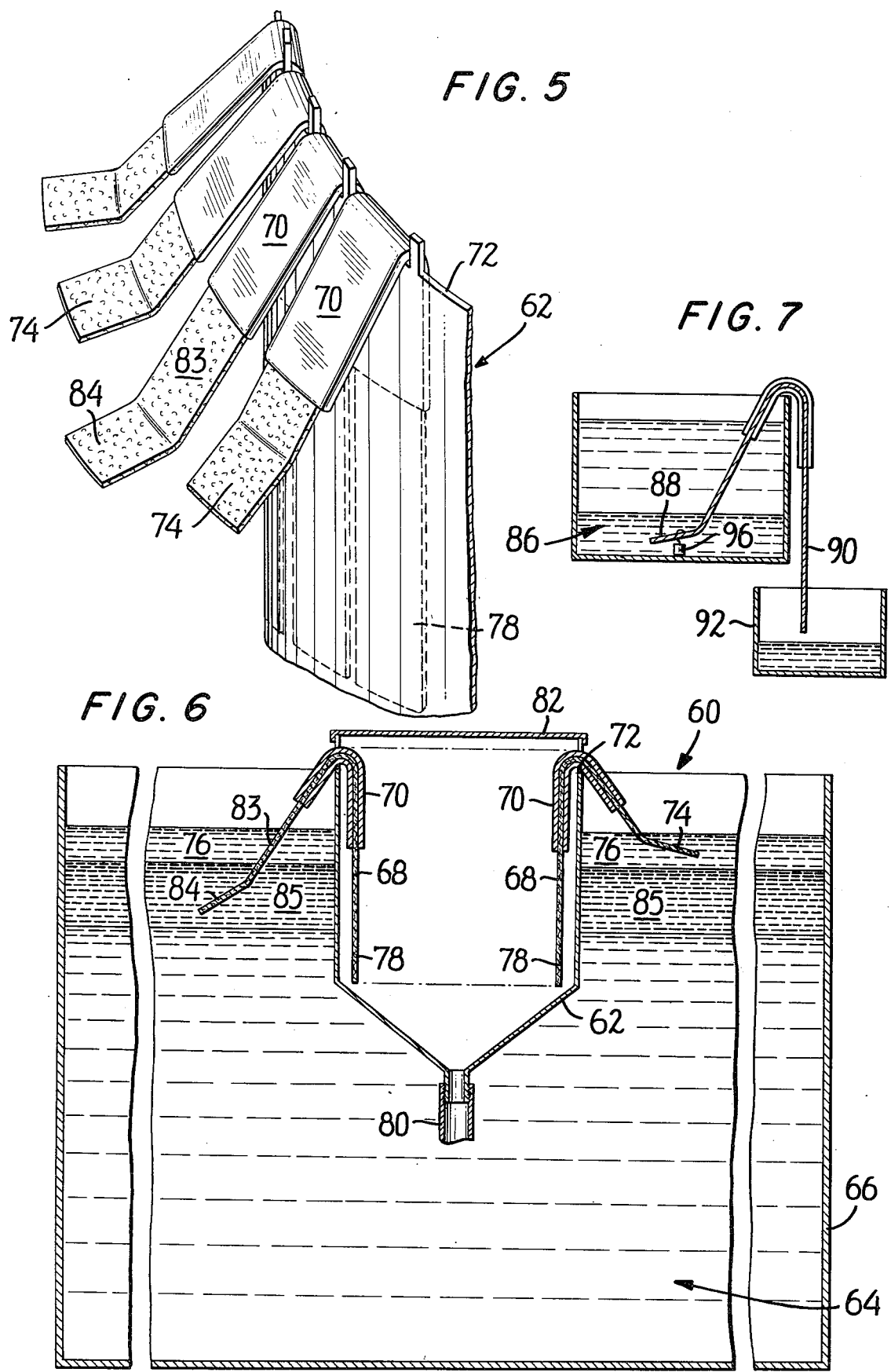

APPARATUS FOR REMOVAL OF AN IMMISCIBLE LIQUID FROM A LIQUID MIXTURE

BACKGROUND OF THE INVENTION

1. Field of the Invention

The present invention relates to the removal of a first immiscible liquid from a liquid mixture and is especially suited to removing oil from an aqueous mixture.

2. Description of the Prior Art

Concern over pollution of the environment has dramatically increased in recent years, especially concern over pollution of water by an immiscible liquid thereon such as hydrocarbons, e.g., oil. The concern has been evidenced by the many patents recently granted which are directed to cleaning up oil spills on seas, lakes, rivers, etc., of which U.S. Pat. Nos. 3,520,806, 3,630,891, 3,518,183, 3,536,616 and 3,147,216 are representative. See also U.S. Pat. No. 3,764,527. Typical of the liquids immiscible with water are the many different types of hydrocarbons including but not limited to gasolines, kerosenes, light oils, heavy oils, jet fuel, petroleum, asphalt and paraffin crudes, diesel oil, naphtha, water immiscible ketones, aromatic solvents such as benzene, toluene and xylene, terpenes, esters, phenols, aldehydes, amides, amines, mercaptans, fatty acids, fatty acid esters, halo-hydrocarbons, polar organic compounds, and the like and these compounds will hereinafter be represented by oil, the most common polluter. The teachings of the representative patents mentioned above are primarily directed to contacting the oil to be removed, which is on the surface of the water, with a material which will absorb or adsorb oil in preference to water, and then removing the material with the absorbed or adsorbed oil from the surface of the water. The oil in some cases may later be separated from the material, if desired.

However, pollution of water by an immiscible liquid therein such as oil may also occur by discharging aqueous mixtures containing an immiscible liquid such as oil into seas, lakes, rivers, etc. For example, there are many instances in industry in which an immiscible liquid such as oil must be removed from an aqueous mixture before discharge for environmental reasons. Moreover, there are many industrial instances in which it is desirable or necessary to remove an immiscible liquid such as oil from another immiscible liquid such as water either to recycle the oil or the water, or both, for reuse. In such industrial applications, where the mixture is usually contained in a tank or similar type vessel, it is impractical to use the techniques of the foregoing patents mainly because of time, space and economic considerations. Known techniques for the removal of the oil from mixtures in vessels, exemplified by U.S. Pat. Nos. 3,915,859, 3,487,927, 3,146,192, 3,764,527 and 2,866,827, involve passing an oil absorbtive or adsorbtive material through or along the surface of the mixture in an endless fashion while continuously separating the oil from the material by, for example, compressing or "squeegeeing" the material. Other known techniques for the removal of an immiscible liquid from a liquid mixture, include settling and/or skimming or pumping operations for removing the immiscible liquid from the surface of the mixture. One such process for the removal of oil from an aqueous mixture requires pumping the mixture into a vacuum tank, allowing the mixture to settle, draining off the water and pumping the oil into a settling tank, decanting the water and finally heating the settled oil to drive off the remaining water.

These known industrial separation processes and apparatus have many disadvantages and drawbacks. For example, almost all of the foregoing industrial processes and apparatus remove considerable water and coarse solid particles along with the oil in the initial separation phase. This, of course, requires additional steps in the respective processes where further separation is desired or required. Where settling is used, appropriate vessels must be provided resulting in consumption of space and capital. All of the known processes and apparatus require the consumption of power in the pumping or heating operations or to effect movement within or by the apparatus. Known apparatus comprise many moving parts and where they include floats or skimmers are also quite bulky and are easily damaged. Moreover, the known processes and apparatus cannot easily accommodate oil level and mixture level changes and, except for settling processes, are not capable of removing heavier than water oils. In addition, since the processes involve a multitude of steps and the apparatus comprise many moving parts, personnel are continually occupied in carrying out the respective processes.

The present invention obviates these drawbacks and disadvantages and provides additional advantages, such as reduced labor, time, space, and apparatus complexity, which result in reduced costs, as well as providing significantly improved results in removing an immiscible liquid from a liquid mixture.

SUMMARY OF THE INVENTION

The present invention is embodied in and carried out by an apparatus for removing a first immiscible liquid from a liquid mixture comprising at least two immiscible liquids. By a liquid mixture comprising immiscible liquids, it is meant that the mixture is non-homogeneous and in the nature of a mixture in which the different liquids thereof settle into separate liquid phased or layers. A sorbent material capable of preferential sorption of one of the liquids is positioned in siphon fashion with a first or intake end placed in the mixture in contact with the first immiscible liquid and a second or discharge end positioned below at least the top of the liquid level at the liquid to be removed and outside of the mixture. The sorbent material is preferentially sorptive of the first immiscible liquid over any other liquid, in the mixture. The first immiscible liquid is removed from the mixture through a mechanism which resembles siphoning by the sorbent material.

While there is no logical explanation as to why the sorbent materials will act like siphons and release liquid when placed in siphon relationship to the liquid to be sorbed, the fact remains that the phenomenon does in fact occur and this is a very important aspect of the present invention. "Siphoning" and "siphon" as used herein with respect to sorbent material refer to this phenomenon. The siphon may be primed by saturating the sorbent material from the first end to a point towards the second end which is below the first end. After the material siphon is primed, it will siphon the first immiscible liquid from the mixture and stop when the first immiscible liquid no longer contacts the first end. Since the sorbent material is selected to be preferentially sorptive of the first immiscible liquid, substantially none of any other liquid in the mixture will be siphoned therefrom, at least during the term that the preferentially absorbed material is being removed. Surprisingly, priming the siphon is not necessary when the sorbent material is positioned so that the first immiscible liquid will rise towards the second end past the uppermost positioned portion of the material solely due to capillary action or "wicking." Thus the wick-siphon combination according to the present invention may be self-starting or self-priming.

According to the present invention, the sorbent material will self-start siphon any desired immiscible liquid layer in the liquid mixture including the bottom-most or intermediate layers provided the particular liquid to be siphoned is capable of capillary rise or wick in or along the sorbent material. It is not necessary that the particular layer to be removed be free of any immiscible liquid not desired to be removed.

Although not necessary to practice the present invention, pumping may be used to remove the separated liquid, especially in the case where gravity removal is not practical.

A preferred material known by the trademark TUFFLEX, comprises felted fibrous mats of polymeric or cellulosic fibers and combinations thereof produced in known manner; for example, as disclosed in U.S. Pat. No. 2,746,895. Where the presence of cellulosic fibers is substantial, they are treated in known manner, for example as disclosed in aforementioned U.S. Pat. No. 3,630,891.

Another preferred material is open-celled polyurethane. Other preferred materials are 3-M Miscrofiber and those disclosed in aforementioned U.S. Pat. No. 3,630,891. Suitable polymers as in the following U.S. Pat. Nos. 3,518,183 and 3,147,216.

The following advantages are realized by the present invention when used to remove oil from water over known oil removal systems as described hereinabove:

(a) the removed oil has a substantially reduced negligible water content which may permit reuse of the oil without further treatment;

(b) the removed oil contains no coarse solids;

(c) the invention may be practiced without external power (although power may be used if gravity removal of the collected oil is not feasible);

(d) the invention requires no moving parts; and (e) the collection apparatus will automatically adjust to changing liquid levels and does not need manual adjustment.

The foregoing advantages result in reduced cost, labor, space, time and the elimination of complex apparatus and processes.

These and other aspects of the present invention will be more apparent from the following detailed description of the invention when considered in conjunction with the accompanying drawing.

BRIEF DESCRIPTION OF THE DRAWING

The invention is illustrated by way of example in the figures of the accompanying drawing in which like numerals refer to like parts:

FIG. 1 is an isometric view in cross-section showing sorbent material positioned as a siphon according to the present invention;

FIG. 2 shows in more detail a sorbent material positioner;

FIGS. 3 and 4 show other embodiments of sorbent materials configuration;

FIG. 5 is an isometric side view of the sump and several sorbent material strips shown in FIG. 6;

FIG. 6 is a cross-sectional side view showing sorbent material strips (only two being shown) positioned as a siphon on a floating collection sump for lighter-than-water oils according to the present invention; and FIG. 7 shows diagrammatically an embodiment of the invention for removing heavier-than-water oils.

DESCRIPTION OF THE PREFERRED EMBODIMENTS

While the present invention is operable to remove a first immiscible liquid from a liquid mixture as described hereinbefore, description of preferred embodiments will be limited to a description of the removal of oil from aqueous mixtures as this will be illustrative of the removal of an immiscible liquid other than oil, from a liquid mixture.

As mentioned hereinbefore, the present invention is operable to remove any desired immiscible liquid layer in a liquid mixture and, accordingly, is operable to remove both heavier and lighter-than-water oils. FIGS. 1, 5 and 6 show embodiments for removing lighter-than-water oils and FIG. 7 shows an embodiment for removing heavier-than-water oils.

Referring now specifically to FIG. 1, a vessel or tank 10 is shown containing an immiscible aqueous mixture 12 comprising oil and water is separated into an oil layer 14 and a water layer 16. It is not essential that the oil layer be free of water to practice the present invention. Strips 18 of sorbent material as described hereinbefore are positioned with the intermediate portions 20 thereof over the top edge 22 of the tank 10. The first or intake ends 24a, 24b of the sorbent strips 18 are positioned in (24a) or on (24b) the oil layer 14. The second or discharge ends 26 are positioned outside the tank 10 and below the top of oil level layer 14, and are shown to be below the first ends 24a and 24b. An oil collection trough 28 is provided outside the tank 10 and below the oil layer 14, the ends 26 of the sorbent strips extending within the trough 28. An oil discharge conduit 30 communicates trough 28 with a suitable reservoir (not shown) to provide drainage of oil from the trough to the reservoir.

Wick positioners 32, as best shown in FIG. 2, made of metal, plastic or other suitable rigid or semi-rigid material have the central portions 34 thereof gently curved to form a somewhat broad angle between opposed end positions 36 and 38, here shown for purposes of illustration as an acute angle. The positioners 32 are placed over the tank edge 22 with the central portions thereof in contact therewith. The strip portions 20 are placed over and along the positioners 32. The purpose of the positioners is to prevent contact between the tank walls and the sorbent material which would tend to impede removal of the oil. Additionally, it is undesirable for the strips to be sharply bent as this would also tend to impede oil removal and would also reduce the life of the strips.

Oil is removed from the tank 10 as follows. The sorbent strips, being preferentially sorptive of the oil, sorb oil in the strip portions 24a, 24b which are in contact with the oil. Capillary action, or wicking, causes the sorbed oil to rise in strip portions 40 to a predetermined height H (not shown) determined by the viscosity of the oil and the properties of the particular sorbent material. For number 2 and a Tufflex strip, the rise will be at least about 2 inches. If the height from the top of the oil layer to the uppermost portion of the strip referenced by 42 is less than height H, wicking will continue in strip portions 44 until the sorbed oil wicks over the tank edge 22 and down to the level referenced by 45 below the level of the oil layer 14. Once strips 18 have sorbed oil over the edge of tank 10 to level 45, strips 18 will surprisingly act as a siphon; the oil will flow out of the end of it and thereby removing oil from the tank and discharging the oil from ends 26 into trough 28. Wicking alone, if height 42 is less than height H, will be operative to completely sorb the strip with oil. However, without the siphon action of the sorbent strip, wicking alone would account for only a small quantity of oil removed. The foregoing description in which wicking and siphoning are combined permits the oil removal by the strips to be self-starting or self-priming. However, when height 42 is greater than the height H, wicking will not sorb oil over the tank edge 22 and the oil siphon will not be self-starting. In such a case, it is sometimes still possible to obtain the siphon action if the sorbent material is primed. This is accomplished by contacting and sorbing the strip with oil from ends 24a and 24b towards ends 26 to level 45. Once primed and started, the siphon will remove and continue to remove oil until portions 24a, 24b no longer contact the oil to be removed. Since the sorbent material is preferentially sorbent of oil over water, siphoning will cease when the oil is removed and the strip ends 24a, 24b contact the water.

Description hereinbefore has been directed to the use of sorbent material in the form of strips 18 for siphoning the oil from the mixture. However, other geometric configurations of sorbent material will work satisfactorily. For example, a continuous sheet 46 (FIG. 3) or other parallelepiped of sorbent material positioned on a positioner 48 or solid tube of sorbent material 50 (FIG. 4) positioned on positioner 52 also yield satisfactory results. Additionally, it has been found that shaping the discharge end of the sorbent material such as tapering end 53 of tube 50 increases the rate at which oil is siphoned. Also, the sorbent material has been described as being positioned over the tank edge 22. However, it may be positioned over any suitable location or opening such as opening 54.

Referring now to FIGS. 5-6, an oil removal system 60 is shown. A floating oil collecting sump 62 is positioned in the aqueous mixture 64 contained by tank 66. Sorbent strips 68 (only two of which are shown in FIG. 6) are positioned on positioners 70 over sump upper edge 72 along the periphery of the sump. The strips 68 and positioners 70, as best shown in FIG. 6 are positioned so that strip ends 74 contact the oil layer 76 which is desired to be separated from the aqueous mixture 64. The opposed strip ends 78 are positioned inside sump 62 and extend therein to below the top of layer of oil 76. Oil is siphoned, either self-starting by wicking or started by priming as described hereinbefore, from layer 76 and discharged into sump 62 in the same manner as described hereinbefore with respect to FIG. 1. The discharged oil is removed from sump 62 through discharge conduit 80 communicating the bottom of sump 62 with a reservoir (not shown). The conduit 80 extends through the lower portion of tank 66 in a fluid tight manner into a reservoir (not shown) positioned below sump 62 to thereby permit gravity feed of the collected oil from the sump to the reservoir. A pump (not shown) may be employed to remove the collected oil from the sump. If so, the reservoir need not be positioned below the sump. Completely enclosing the intermediate portions of the strips 68 by the positioners 70 is preferred to protect the sorbent material from wear and for the reasons given hereinbefore with respect to positioners 32. Where the tank 66 is subject to the environment, such as in an outdoor location, sump cover 82 is provided to protect the collected oil from rain or other matter.

The system 60 is capable of removing oil from the mixture substantially regardless of the mixture level since the sump 62 floats in the mixture and the strip ends 78 will always be below the upper oil layer 76 with which strip ends 74 are continuously in contact.

While in most cases the immiscible oil liquid which is desired to be removed from the aqueous mixture will be lighter-than-water and, accordingly, constitute the uppermost layer of the mixtures, there may be instances in which heavier-than-water oils will be desired to be removed from intermediate or the bottom-most layers of the aqueous mixture. An intermediate layer may be removed as shown in FIGS. 5 and 6 by providing a strip 83 whose end 84 is extended into the intermediate layer 85. Of course, strip end 78 must still be below the top of intermediate layer 85 for the strip to siphon and the strip must be preferentially sorptive of the oil constituting the intermediate layer.

Referring now to FIG. 7, oil constituting the bottommost layer in the mixture may be removed by contacting the lowermost layer 86 with strip end 88 and discharging the siphoned oil from strip end 90 which extends below the top of the bottom-most layer. A suitable trough 92 or reservoir located below the bottommost layer 86 is positioned to collect the siphoned oil. Ballast which may take the form of weight 96 may be required to maintain the intake end 88 of the siphon in contact with the desired liquid layer. For the upper layers, the positioners may not require ballast and may be extended so that the siphon intake end is positioned in or on the desired layer.

The present invention, as described hereinbefore, is operative to remove any desired layer of oil in a liquid mixture. Of course, the lighter oils can usually be removed from the mixture more easily and rapidly than the heavier oils. Moreover, heating the oil to reduce its viscosity will increase the removal rate. Additionally, boiling of the "light ends" in the mixture would retard removal of the oil while adding lighter oils has been found to assist in removing sludge and heavier oils. It has also been found that the rate of removal is greater when the siphon does not contact the vessel surface and is gently bent about the top edge of the vessel. Accordingly, as shown and described hereinbefore, positioners are used to accomplish this. It has also been found that the rate of removal is greater when the discharge end is at least partly immersed in the removed liquid. This is easily accomplished by, for example, positioning the discharge conduit in the sump or trough above the discharge end of the siphon.

A number of trials have been made using various sorbent materials including Tufflex brand material and open cell polyurethane foam. In each of these instances the materials were cut into strips and used to remove one immiscible liquid from another in accordance with the present invention. The materials have been found to be effective in "wicking-siphoning" a wide variety of materials from aqueous mixtures, including many different weight of oils (#6 bunker, #2 light duty, 2-crude, etc.), as well as materials heavier than water such as Dowtherm E.

As mentioned hereinbefore, while the description of the preferred embodiments was accomplished using oil as the siphoned immiscible liquid, any immiscible liquid may be siphoned according to the present invention as long as the siphon material is preferentially sorptive of that liquid and that liquid is capable of capillary rise in the material. Accordingly, oil was chosen merely for purposes of illustration and it is not intended to limit the spirit and scope of the claims hereof. It is known, however, that the polar liquids wick and rise due to capillary action more easily than the non-polar liquids, and that temperature, liquid viscosity and the sorbent material composition and configuration affect wicking and capillary action. Moreover, while two geometric shapes for the material siphon have been illustrated — parallelepiped (strip or blanket) and cylinder — it is to be understood that any desired geometric shape which would permit capillary rise of the immiscible liquid in and/or along the material could be used. In this respect, some configurations will be more efficient than others and it has been found that a pointed or tapered discharge end will release sorbed liquid from the material siphon at a faster rate than a blunt or evened end. Additionally, the sorbent material may comprise other compositions than those disclosed herein as long as the material is preferentially sorptive of the immiscible liquid desired to be removed from the mixture and as long as the material permits capillary rise of the immiscible liquid in and/or along the material.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. Apparatus for continuously removing oil from an aqueous mixture comprising:
   (a) a vessel floating in the mixture for collecting the removed oil, said vessel having a closed outside perimeter in contact with the oil and a top perimeter extending above the surface of the mixture and at least one opening located in said top perimeter above the top of the oil layer, said at least one opening communicating between the outside and the inside of said vessel;
   (b) a hollow interior in said vessel, said hollow interior extending to a level substantially below the surface of the oil in said mixture;
   (c) at least one elongated sorbent material member preferentially sorbtive of oil over water, said at least one member having opposed ends;
   (d) means for positioning said at least one member through said at least one opening with a first of said opposed ends positioned in contact with the oil outside said vessel, the second of said opposed ends positioned within said hollow interior in said vessel at least below the top of the oil layer outside said vessel and the intermediate portion of said member which passes through said opening being above the level of the top of said mixture, whereby oil is siphoned by said sorbent material from the mixture outside said vessel through said intermediate portion and released into said hollow interior in said vessel.

2. The apparatus recited in claim 1 further comprising at least one point on said second opposed end.

3. The apparatus recited in claim 1 further comprising means for maintaining oil within said hollow interior at a level which contacts said second opposed end.

4. The apparatus recited in claim 1 further comprising tube means attached to the bottom of said hollow interior for draining collected oil from said hollow interior.

* * * * *